US008523415B2

(12) United States Patent
Kiel et al.

(10) Patent No.: US 8,523,415 B2
(45) Date of Patent: Sep. 3, 2013

(54) VEHICLE LAMP

(75) Inventors: Henning Kiel, Wolfsburg (DE); Mathias Thamm, Oebisfelde (DE); Sebastian Haering, Wolfsburg (DE)

(73) Assignee: Volkswagen AG, Wolfsburg (DE)

(*) Notice: Subject to any disclaimer, the term of this patent is extended or adjusted under 35 U.S.C. 154(b) by 412 days.

(21) Appl. No.: 12/937,805

(22) PCT Filed: Feb. 27, 2009

(86) PCT No.: PCT/EP2009/052406
§ 371 (c)(1),
(2), (4) Date: Dec. 14, 2010

(87) PCT Pub. No.: WO2009/127464
PCT Pub. Date: Oct. 22, 2009

(65) Prior Publication Data

US 2011/0103085 A1 May 5, 2011

(30) Foreign Application Priority Data

Apr. 16, 2008 (DE) ........................ 10 2008 019 125

(51) Int. Cl.
*B60Q 1/04* (2006.01)

(52) U.S. Cl.
USPC .......................................... 362/519; 362/516

(58) Field of Classification Search
USPC .......................................... 362/516, 519, 539
See application file for complete search history.

(56) References Cited

U.S. PATENT DOCUMENTS

| | | | | |
|---|---|---|---|---|
| 6,966,675 | B2 * | 11/2005 | Albou | 362/298 |
| 2006/0181892 | A1 | 8/2006 | Worakasemsuk et al. | 362/475 |

FOREIGN PATENT DOCUMENTS

| | | |
|---|---|---|
| DE | 10359185 | 7/2005 |
| EP | 1411291 | 4/2004 |
| FR | 1418890 | 11/1965 |
| GB | 2350883 | 12/2000 |

OTHER PUBLICATIONS

International Search Report for Application No. PCT/EP2009/052406 (3 pages), Apr. 28, 2009.

* cited by examiner

*Primary Examiner* — David V Bruce
(74) *Attorney, Agent, or Firm* — King & Spalding L.L.P.

(57) ABSTRACT

A lamp for a vehicle has a light source (1), a first reflector (2), and at least one light pane (6, 7), which are disposed so that light emitted by the light source (1) is reflected by a reflector face (3) of the first reflector (2) and forms a first lamp face (17) of the lamp. The lamp has at least one second reflector (4), the reflector face (5) thereof being disposed separately from the reflector face (3) of the first reflector (2) and the second reflector being disposed so that light emitted by the light source (1) is reflected by the reflector face (5) of the second reflector (4) and forms a second lamp face (18) of the lamp, wherein the first and the second lamp faces (17, 18) are not coherent.

20 Claims, 3 Drawing Sheets

VEHICLE LAMP

CROSS-REFERENCE TO RELATED APPLICATIONS

This application is a U.S. National Stage Application of International Application No. PCT/EP2009/052406 filed Feb. 27, 2009, which designates the United States of America, and claims priority to German Application No. 10 2008 019 125.6 filed Apr. 16, 2008, the contents of which are hereby incorporated by reference in their entirety.

TECHNICAL FIELD

The present invention relates to a lamp for a vehicle comprising a light source, a first reflector, and at least one light pane, which are arranged such, that light emitted by the light source is reflected by a reflector face of the first reflector and forms a first lamp face of the lamp.

BACKGROUND

During a redesign of vehicles the problem arises, that due to the desired aerodynamics and the desired design the installation space characteristics for illumination units, in particular for the lamps including tail lights and head lamps, are dimensioned very tight. However, the signaling effect of a lamp is determined by the size of the perimeter of the radiating face and by the light density.

Furthermore, the vehicle lamps largely add to the design of the vehicle. By means of the forming of the lamps, the vehicle often is to be given a characteristic appearance, which is easily recognized. In addition, the problem arises, that the cost of manufacturing the lamps shall be as low as possible.

SUMMARY

According to various embodiments, a lamp of the type contemplated above can be provided which on the one hand adds a characteristic appearance to the vehicle, however, on the other hand may be easily adapted to different installation space characteristics and which finally may be manufactured in a cost-effective manner. In addition, the light density of the lamp faces is to be as homogeneous as possible.

According to an embodiment, a lamp for a vehicle may comprise a light source, a first reflector and at least one light pane which are arranged such that light emitted by the light source is reflected by a reflector face of the first reflector and forms a first lamp face of the lamp, wherein the lamp has at least one second reflector whose reflector face is arranged separate from the reflector face of the first reflector, and is arranged such, that light emitted by the light source is reflected by the reflector face of the second reflector and forms a second lamp face of the lamp, wherein the first and the second lamp faces are not contiguous.

According to a further embodiment, the light source can be arranged in the focal point of the reflector face of the first reflector and in the focal point of the reflector face of the second reflector. According to a further embodiment, the reflector face of the first reflector may lie on a face formed by a first paraboloid of revolution and the reflector face of the second reflector lies on a face formed by a second paraboloid of revolution. According to a further embodiment, the first and the second paraboloid of revolution can be identical. According to a further embodiment, the first and the second paraboloid of revolution can be different. According to a further embodiment, the light emitted by the light source may directly impinge the reflector face of the first reflector and directly impinges the reflector face of the second reflector. According to a further embodiment, the at least one light pane may comprise light dispersing elements both on the side facing towards the light source and on the side facing away form the light source. According to a further embodiment, the light dispersing elements may extend in horizontal direction on the side facing away form the light source. According to a further embodiment, the light dispersing elements can be partial cylinders horizontally aligned on the side facing away from the light source. According to a further embodiment, the light dispersing elements may extend in vertical direction on the side facing towards the light source. According to a further embodiment, the at least one light pane or the light dispersing elements of the light pane can be only arranged in the region of the lamp faces of the lamp. According to a further embodiment, the light source can be shielded by a mask which prevents a direct view onto the light source from the outside. According to a further embodiment, the lamp may have a housing which is sealed off by an end pane in the direction of the light emission and the at least one light pane is arranged within the housing. According to a further embodiment, the first lamp face may have the shape of a disk or a rectangle.

According to a further embodiment, the second lamp face may have an angulated shape.

BRIEF DESCRIPTION OF THE DRAWINGS

The invention is now described by means of an exemplary embodiment with reference to the drawings.

DETAILED DESCRIPTION

Figure 1:
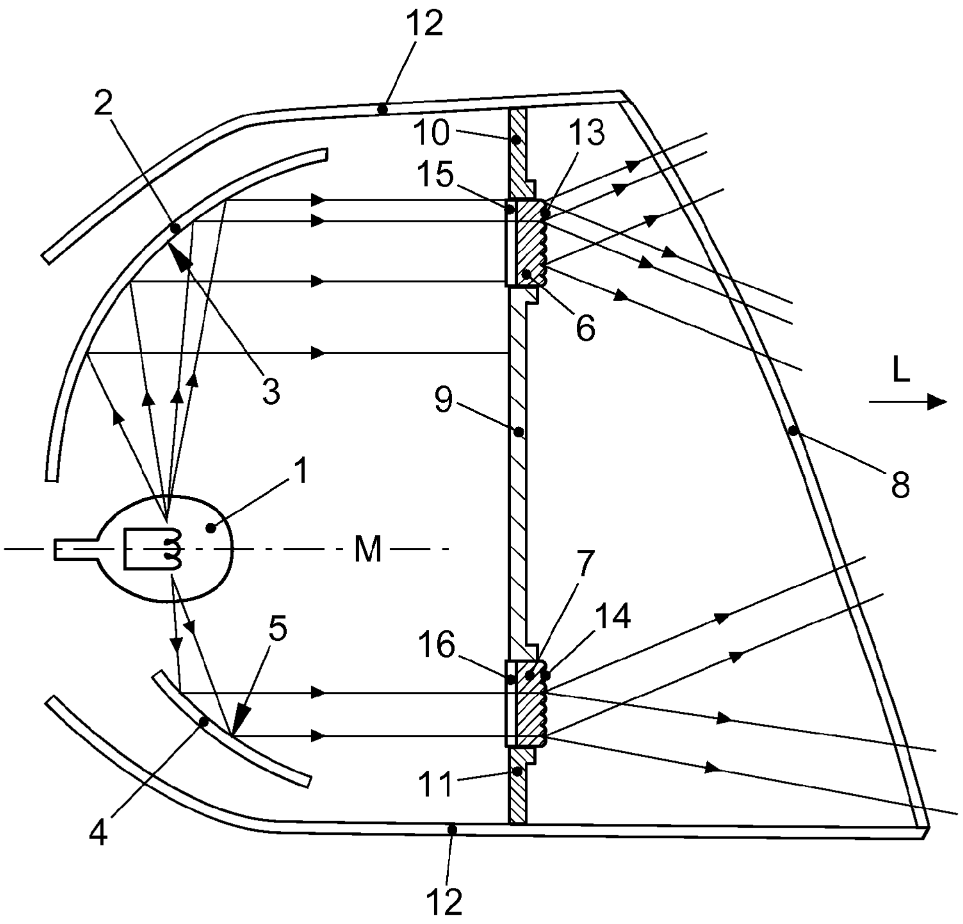
FIG. 1 schematically shows a cross section of an exemplary embodiment of the lamp.

The lamp according to various embodiments is characterized in that it has at least one second reflector, whose reflector face is arranged separate from the reflector face of the first reflector and which is arranged such that light emitted by the light source is reflected by the reflector face of the second reflector and forms a second lamp face, wherein the first and second lamp faces are discontiguous.

Thus, according to various embodiments the light emission of the one light source impinges two separate reflector faces, which provide two separate lamp faces. In conventional lamps comprising discontiguous lamp faces several light sources are provided. Typically, dedicated to each lamp face is at least one separate light source. Due to the construction of the lamp according to various embodiments costs may be saved in the production of the lamp since only one light source is required. Furthermore, the installation space for the further light source typically provided may be saved. At last, the discontiguous lamp faces of the lamp may provide a characteristic signature by means of which the vehicle may be easily recognized.

According to an embodiment of the lamp the light source both is arranged in the focal point of the reflector face of the first reflector and in the focal point of the reflector face of the second reflector. The focal point of a reflector face is understood to be the location from which emitted beams of light are reflected by the reflector face such that the reflected beams of light run in parallel with each other. Thus, the beams of light emitted by the light source in this embodiment of the lamp are reflected by the reflector faces of the two reflectors such that each light beam is generated by parallel beams of light. Not until the light pane the parallel beams of light are dispersed. This embodiment has the advantage, that the lamp faces feature a homogeneous light density. In particular, it is not possible to identify a light source within a lamp face. In established lamps, in which the light emission of several light sources is used for a lamp face it has been found that, in particular from large distances, areas of higher light intensity are formed within a lamp face. The observer can relate these areas of higher light intensity to the individual light sources. Such an identification is avoided by the lamp according to various embodiments.

According to a embodiment of the lamp the reflector face of the first reflector lies on a face formed by a first paraboloid of revolution. In addition, the reflector face of the second reflector lies on a face formed by a second paraboloid of revolution. In particular, the light source is arranged in the focal point of both of the two paraboloids of revolution. Due to the parabolic shape of the reflector faces and the arrangement of the light source in the focal point of the parabolas the light reflected by the reflector faces is in parallel. Due to this parallelism of the reflected light, which is constituted by the two lamp faces, the light intensity in these lamp faces is very homogeneous from all viewing angles. Thus, viewed from all angles the lamp faces appear to have the same brightness.

The two paraboloids of revolution may be identical. In this case, the two reflector faces lie separate to each other on the face of a single paraboloid of revolution. In doing so, the selection of the position and the size of the reflector faces on the imaginary paraboloid of revolution on the one hand may be dependent on the installation space characteristics and on the other hand on the shape and size of the desired lamp faces.

According to another embodiment, the first and the second paraboloid of revolution are different. Thus, the two paraboloids of revolution have differing parameters, wherein the focal point of the two paraboloids of revolution identically lies at the position of the light source. In this case, the position of the two reflector faces can be varied to a larger degree, so that the lamp may be adapted to the installation space characteristics even better. As a result, reflector faces arranged in a staggered manner and separate to each other are yielded which provide parallel light beams in the direction of the light pane.

According to an embodiment of the lamp, the light emitted by the light source directly impinges the reflector face of the first reflector and directly impinges the reflector face of the second reflector. Neither optically effective elements, such as lenses, prism or the like, nor transparent disks are arranged between the light source and the reflector faces.

According to a further embodiment of the lamp the light pane comprises light dispersing elements. The light pane in particular comprises light dispersing elements both on the side facing towards the light source and on the side facing away from the light source. Preferably, the light dispersing elements on the side facing away from the light source extend in horizontal direction. In particular, these are horizontally aligned partial cylinders. On the side facing towards the light source, light dispersing elements preferably extend in vertical direction. In this case also these may be vertically aligned partial cylinders. On the light entry side and the light outlet side, respectively, the partial cylinders in cross-section may have the shape of a circle or a parabola section or another convex curvature, which substantially results from the desired light dispersion. Here, the light dispersing elements on the side facing away from the light source preferably are formed particularly distinctive. They have another curvature than the light dispersing elements on the side facing towards the light source. The curvature of the horizontally aligned partial cylinders on the side facing away from the light source of the light pane in particular is smaller than the curvature of the vertically aligned partial cylinders on the side facing towards the light source. This formation results in that the partial cylinders on the outer side are very distinctively visible from the outside.

The light dispersing elements of the light pane make sure that the parallel light impinging the light pane from the reflectors is dispersed in the desired angles. In this case, the light dispersing elements are formed such, that the outline of the light pane on the side visible from the outside corresponds to the aesthetic requirements, i.e. the desired design, whereas the light dispersing elements on the backside, i.e. on the side facing towards the light source, take the main function of light dispersion. Thus, by means of the side visible from the outside of the light pane a particular light dispersion is created. However, the desired light dispersion only is created by the addition of the light dispersing elements on the side not visible from the outside.

According to a further embodiment of the lamp the light pane or the light dispersing elements of the light pane only are arranged in the region of the lamp faces of the lamp. The light pane therefore may consist of two separate light panes. In addition, also only the light dispersing elements may be provided in these regions, but apart from that the light pane may be contiguous.

According to a further embodiment of the lamp the light source is shielded by a mask, which prevents a direct view onto the light source from the outside. In this manner it is ensured that only the two lamp faces are perceived from the outside and not the light source itself.

According to a further embodiment of the lamp, it has a housing, which is sealed off by an end pane in the direction of light emission. In this case, the light pane is arranged inside the housing. Thus, it forms an intermediate light pane. The end pane preferably is carried out in clear glass visual appearance, i.e. it may be looked into the inside of the housing from the outside without a substantial detraction. Thus, both in the activated state of the light source and in the deactivated state of the light source the appearance of the lamp is defined by the intermediate light pane comprising the light dispersing elements on the outside. Formed on the outside of the intermediate light pane are the lamp faces, which are visible through the end pane.

According to an embodiment of the lamp, the first lamp face may have the shape of a disk or a rectangle and the second lamp face may have an angulated shape.

Referring to FIG. 1, at first the general construction of the lamp is described. The lamp of the exemplary embodiment shown is a tail lamp. It is to be noted, that the cross section shown in FIG. 1 not necessarily is along a plane. In fact, the cross section may be chosen such, that both reflectors are visible. In the following, the indications of direction, such as horizontal, vertical and lateral, refer to an installation of the lamp in a vehicle.

The lamp comprises a light source 1. In this connection it may be a commonly known light source 1 which is as punctiform as possible. Furthermore, provided is a first reflector 2 comprising a reflector face 3. As shown in FIG. 1, the light emitted by the light source 1 impinges the reflector face 3 and from there is reflected into the direction L of the main light emission of the lamp. The reflector face 3 lies on the face of a first paraboloid of revolution, wherein the light source 1 is arranged in the focal point of this first paraboloid of revolution. The light of the light source 1 impinging the reflector face 3 thus is reflected such, that a parallel light beam is formed. This light beam impinges a light pane formed as intermediate light pane 6. The intermediate light pane 6 has light dispersing elements 15 on the side facing towards the light source 1 and light dispersing elements 13 on the side facing away form the light source 1, i.e. on the side visible from the outside. By means of these light dispersing elements 15 and 13 the light is diverted in vertical and horizontal directions and a lamp face 17 is formed as described later.

Furthermore, the lamp comprises a second reflector 4 whose reflector face 5 is arranged separate form the reflector face 3 of the first reflector 2. The light emitted by the light source 1 also impinges the reflector face 5 of the second reflector 4 and from there is reflected in the direction L. The reflector face 5 of the second reflector 4 also lies on a face formed by a paraboloid of revolution. The paraboloid of revolution of the reflector face 5 of the second reflector 4 may be the same as the paraboloid of revolution on the face of which also lies the reflector face 3 of the first reflector 2. In the present case, however, the reflector face 5 of the second reflector 4 lies on the face of a second paraboloid of revolution, which differs from the first paraboloid of revolution. However, the focal points of the two paraboloids of revolution in each case lie at the position of the light source 1. In the present case, both the reflector faces 3 and 5, and the two reflectors 2 and 4 are arranged separate from each other.

The light emitted by the light source 1, which impinges the reflector face 5 of the second reflector 4, is reflected by the reflector face 5 such, that a further parallel light beam is created which impinges a second intermediate light pane 7. In the present exemplary embodiment the intermediate light pane 7, like the intermediate light pane 6, has light dispersing elements 16 on the side facing towards the light source 1 and light dispersing elements 14 on the side facing away from the light source 1. In this connection, the light dispersing elements 13 and 14 of the intermediate light panes 6 and 7, which are arranged on the side facing away from the light source 1, may be formed identical. Formed by the intermediate light pane 7 is a second lamp face 18, which is characterized in that it is not connected to the first lamp face 17, which is formed at the intermediate light pane 6. Thereby, from a single light source 1 two separate lamp faces 17 and 18 are accomplished.

In another embodiment of the lamp the reflector faces 3 and 5 are no paraboloids of revolution but so called freeform reflector faces. Thereby, the freeform reflector faces are adapted to the arrangement of the light source 1 such, that a parallel light beam is created by the freeform reflector faces. In this sense, in doing so the light source 1 is arranged in the focal point of the freeform reflector faces.

The lamp is provided within a housing 12, which is sealed off to the outside by an end pane 8. The end pane 8 is carried out in clear glass visual appearance, so that the beams of light emanating from the intermediate light panes 6 and 7 substantially are not affected by the end pane 8 with regard to their direction.

The intermediate light panes 6 and 7 are arranged perpendicular to the direction L. In this plane, which is perpendicular to the direction L, a mask 9 is located between the two intermediate light panes 6 and 7, furthermore, located above and below the intermediate light panes 6 and 7 are the masks 10 and 11. Thereby, the mask 9 shields the light source 1 such, that it prevents a direct view from the outside onto the light source 1. Further, the masks 10 and 11 prevent that it may be viewed into the lamp laterally from the outside. Therefore, visible from the outside only are the light dispersing elements 13 and 14 of the sides of the intermediate light panes 6 and 7 facing away from the light source 1 which form the lamp faces 17 and 18.

As shown in FIG. 1, the lamp in its cross section may be terminated by the masks 9, 10 and 11 as well as the intermediate light panes 6 and 7. However, the masks 9 to 11, in particular the mask 9, could also be provided separate from the intermediate light panes 6 and 7. In this case, the intermediate light panes 6 and 7 could be formed by a single intermediate light pane, wherein the light dispersing elements 13 to 16 only are arranged in the region of the desired lamp faces 17 and 18.

Figure 2:
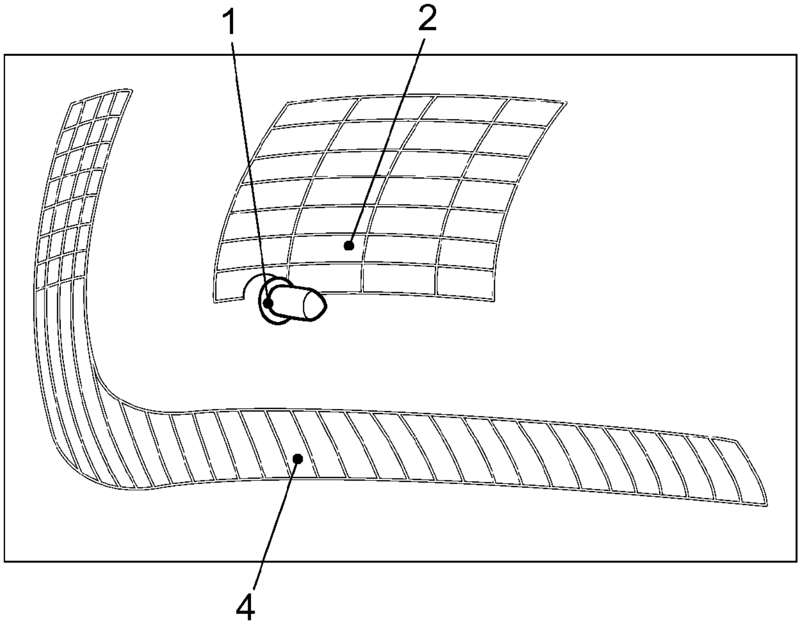
FIG. 2 shows a perspective view of the light source and of the two reflectors of the exemplary embodiment of the lamp.
Figure 3:
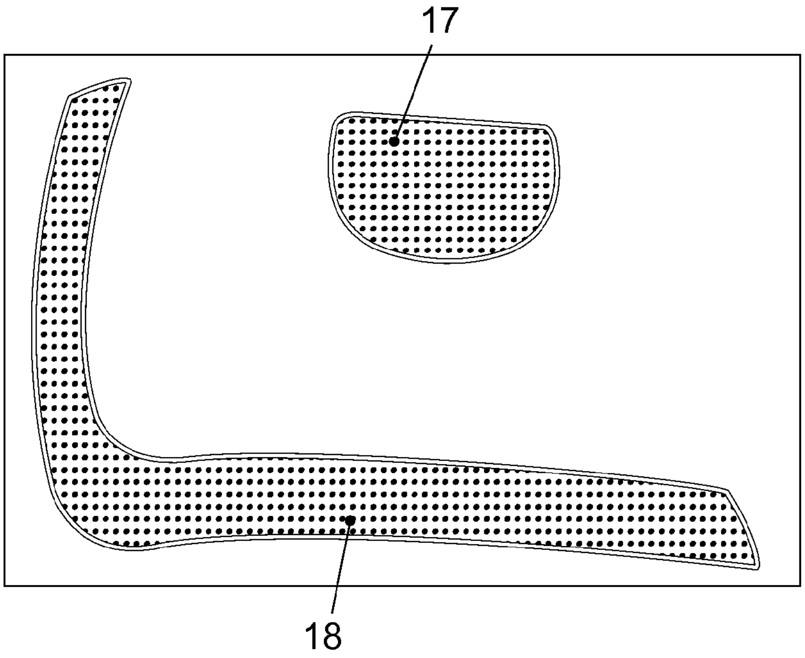
FIG. 3 shows the view of the exemplary embodiment of the lamp in its switched-on state from the outside.

An example for a shape of the lamp faces 17 and 18 and the corresponding reflectors 2 and 4 is in shown FIGS. 2 and 3. The reflectors 2 and 4 are arranged separate from each other in a staggered manner. The shape of the reflectors 2 and 4 complies with the desired shape of the lamp faces 17 and 18 shown in FIG. 3. In the present exemplary embodiment, the lamp face 17 substantially is formed like a disk or a rectangle and the lamp face 18 is angular.

Figure 4:
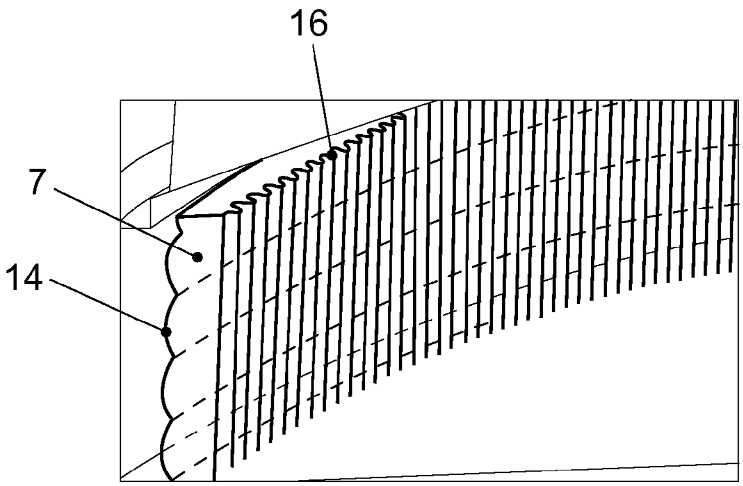
FIG. 4 shows a detail of the exemplary embodiment of the lamp.

FIG. 4 shows a detail of the intermediate light pane 7. The intermediate light pane 6 is formed correspondingly. On the side visible from the outside the intermediate light pane 7 comprises light dispersing elements 14, which extend in a horizontal direction. These are partial cylinders. The curvature of the surface may be circular or may have another convex curved shape. By means of these horizontally extending light dispersing elements 14 the light beam incident in parallel is dispersed in a vertical direction. However, the shape of the light dispersing elements 14 in particular complies with the design the lamp is to be received, since these light dispersing elements 14 are visible from the outside.

Arranged on the inner side of the intermediate light pane 7 are light dispersing elements 16 extending in vertical direction. In this case these are partial cylinders as well, whose curvature, however, differs from the curvature of the partial cylinders of the light dispersing elements 14. The curvature of the light dispersing elements 16 is larger, so that per unit of length more light dispersing elements 16 than light dispersing elements 14 are arranged on the intermediate light pane 7. The light dispersing elements 16 cause a deflection of the light beam incident in parallel into a horizontal direction. Therefore, they substantially determine from which angles the lamp is visible for other traffic. With respect to the configuration of the light dispersing elements 16 aspects of design do not have to be considered since these substantially are not visible from the outside. They may be chosen such, that the optical requirements for the lamp are achieved.

REFERENCE NUMERALS

1 light source
2 first reflector
3 reflector face
4 second reflector
5 reflector face
6 intermediate light pane
7 intermediate light pane
8 end pane
9 mask
10 mask
11 mask
12 housing
13 light dispersing elements
14 light dispersing elements
15 light dispersing elements
16 light dispersing elements

17 lamp face
18 lamp face

What is claimed is:

1. A lamp for a vehicle comprising a light source, a first reflector and at least one light pane which are arranged such that light emitted by the light source is reflected by a reflector face of the first reflector and forms a first lamp face of the lamp, wherein the lamp has at least one second reflector whose reflector face is arranged separate from the reflector face of the first reflector, and is arranged such, that light emitted by the light source is reflected by the reflector face of the second reflector and forms a second lamp face of the lamp, wherein the first and the second lamp faces are not contiguous.

2. The lamp according to claim 1, wherein the light source is arranged in the focal point of the reflector face of the first reflector and in the focal point of the reflector face of the second reflector.

3. The lamp according to claim 1, wherein the reflector face of the first reflector lies on a face formed by a first paraboloid of revolution and the reflector face of the second reflector lies on a face formed by a second paraboloid of revolution.

4. The lamp according to claim 3, wherein the first and the second paraboloid of revolution are identical.

5. The lamp according to claim 1, wherein the first and the second paraboloid of revolution are different.

6. The lamp according to claim 1, wherein the light emitted by the light source directly impinges the reflector face of the first reflector and directly impinges the reflector face of the second reflector.

7. The lamp according to claim 1, wherein the at least one light pane comprises light dispersing elements both on the side facing towards the light source and on the side facing away from the light source.

8. The lamp according to claim 7, wherein the light dispersing elements extend in horizontal direction on the side facing away from the light source.

9. The lamp according to claim 8, wherein the light dispersing elements are partial cylinders horizontally aligned on the side facing away from the light source.

10. The lamp according to claim 7, wherein the light dispersing elements extend in vertical direction on the side facing towards the light source.

11. The lamp according to claim 7, wherein the at least one light pane or the light dispersing elements to of the light pane is/are only arranged in the region of the lamp faces of the lamp.

12. The lamp according to claim 1, wherein the light source is shielded by a mask which prevents a direct view onto the light source from the outside.

13. The lamp according to claim 1, wherein the lamp has a housing which is sealed off by an end pane in the direction of the light emission and the at least one light pane is arranged within the housing.

14. The lamp according to claim 1, wherein the first lamp face has the shape of a disk or a rectangle.

15. The lamp according to claim 1, wherein the second lamp face has an angulated shape.

16. A vehicle a lamp which comprises a light source, a first reflector and at least one light pane which are arranged such that light emitted by the light source is reflected by a reflector face of the first reflector and forms a first lamp face of the lamp, wherein the lamp has at least one second reflector whose reflector face is arranged separate from the reflector face of the first reflector, and is arranged such, that light emitted by the light source is reflected by the reflector face of the second reflector and forms a second lamp face of the lamp, wherein the first and the second lamp faces are not contiguous.

17. The vehicle according to claim 16, wherein the light source is arranged in the focal point of the reflector face of the first reflector and in the focal point of the reflector face of the second reflector.

18. The vehicle according to claim 16, wherein the reflector face of the first reflector lies on a face formed by a first paraboloid of revolution and the reflector face of the second reflector lies on a face formed by a second paraboloid of revolution.

19. The vehicle according to claim 18, wherein the first and the second paraboloid of revolution are identical.

20. The vehicle according to claim 18, wherein the first and the second paraboloid of revolution are different.

* * * * *